No. 752,970. PATENTED FEB. 23, 1904.
W. GUNDERMANN.
PHOTOGRAPHIC CAMERA.
APPLICATION FILED MAR. 24, 1903.
NO MODEL.
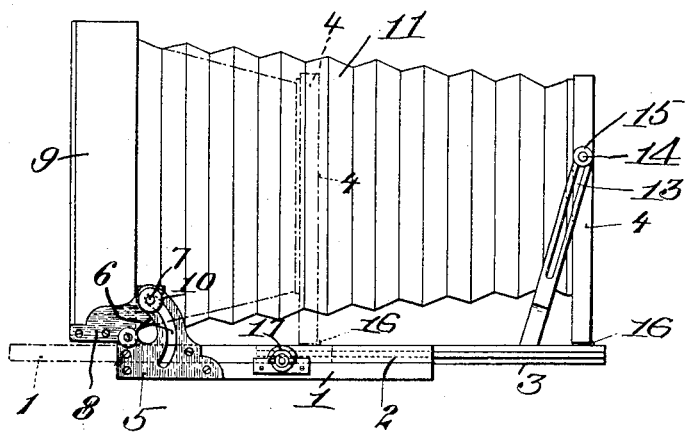
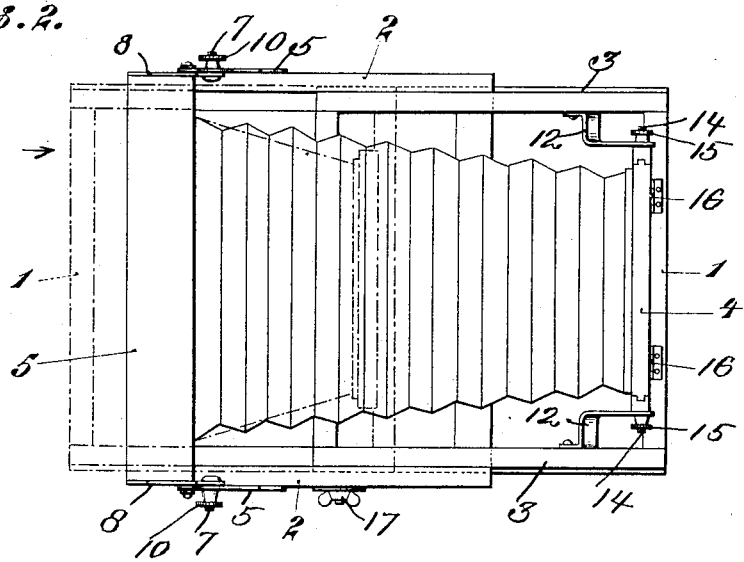
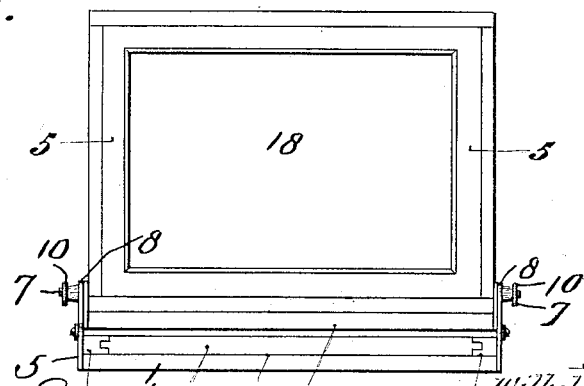
Witnesses: Inventor
Wilhelm Gundermann
Atty.

No. 752,970. Patented February 23, 1904.

UNITED STATES PATENT OFFICE.

WILHELM GUNDERMANN, OF ERFURT, GERMANY.

PHOTOGRAPHIC CAMERA.

SPECIFICATION forming part of Letters Patent No. 752,970, dated February 23, 1904.

Application filed March 24, 1903. Serial No. 149,358. (No model.)

*To all whom it may concern:*

Be it known that I, WILHELM GUNDERMANN, confectioner, a subject of the King of Prussia, Emperor of Germany, residing at Erfurt, in the Kingdom of Prussia and German Empire, have invented certain new and useful Improvements in or Relating to Photographic Cameras, of which the following is a specification.

This invention relates to photographic cameras.

The object of the invention is in a ready, simple, and thoroughly-efficient manner and with avoidance of a multiplicity of parts to effect an extended range of adjustment of the camera-frame; furthermore, to adapt the camera for folding into small compass for purpose of ready transportation.

With these and other objects, as will appear as the nature of the invention is better understood, the same consists in the novel construction and combination of parts of a camera, as will be hereinafter fully described and claimed.

In the accompanying drawings, forming a part of this specification, and in which like characters of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof, and in these drawings—

Figure 1 is a view in side elevation of a camera constructed in accordance with the present invention, the extended position of the parts being exhibited in full lines and the closed position thereof in dotted lines. Fig. 2 is view in top plan. Fig. 3 is a view in end elevation looking in the direction of the arrow in Fig. 2.

Referring to the drawings, 1 designates the base of the camera, provided on each side with grooved guides 2, between which is adapted to work a frame 3, which supports at its outer end the lens-board 4, which may be of the usual or any preferred construction. Both the base 1 and frame 3 are herein shown as hollow approximately rectangular structures, this for the purpose of lightness, it being understood that, if preferred, said parts may be solid structures and still be within the scope of the invention. The base 1 has secured to the outer end of each of its side members a plate 5, each of which is provided with a curved slot 6, which are adapted to be engaged by the shanks of threaded bosses 7, carried by plates 8, secured to the outer sides of the lower portions of the camera-frame 9, thumb-nuts 10, carried by the said bosses, operating to clamp the camera-frame at any desired adjustment. The camera-frame may be of any preferred construction and is connected with the lens-board 4 by an ordinary bellows 11.

Pivoted to the inner surface of each of the side members of the frame 3 is an elbow-link 12, the upper portions of which are longitudinally slotted, as at 13, to straddle threaded bosses 14, carried by the side members of the lens-board, thumb-nuts 15, engaging said bosses, operating to clamp the lens-board at the desired adjustment. The lens-board is hinged at 16 to the frame 3, as clearly shown in Figs. 1 and 2, and is therefore capable of being rocked to effect proper adjustment of the lens with relation to the camera-frame.

Combined with the base 1 is a set-screw 17, Figs. 1 and 2, which by being turned into engagement with one of the side members of the frame 3 will operate to clamp said frame in proper adjustment with relation to the base.

It will be seen by reference to Fig. 3 that there is no obstruction at the front of the camera to the movement of the frame 3, so that the same may be moved to project therebeyond, as indicated by dotted lines in Fig. 1.

In the use of the camera when it is desired to adjust the lens-board with relation to the camera-frame the set-screw 17 is loosened to permit the frame 3 being moved with relation to the base 1, and when the proper focus has been secured the set-screw is again tightened. If the image is not properly centered upon the ground glass 18, the thumb-nuts 10 may be loosened and the camera-frame adjusted until the proper result is secured. In the event that the lens is not properly positioned with relation to the ground glass the thumb-nuts 15 may be loosened and the lens-board adjusted to the proper degree.

When it is desired to fold the camera to occupy but slight space to permit of its being readily transported or placed within a suitable receptacle, the set-screw 17 is loosened and the frame 3, and with it the lens-board, is moved to the position indicated in dotted lines in Fig. 1, after which the thumb-nuts 10 and 15 are loosened, thus to permit the lens-board to be folded down upon the frame 3 and the camera-frame to be folded down upon the lens-board. When the parts are thus positioned, they will occupy but small space, and will thus facilitate handling.

While the arrangement of parts herein shown has been found to be thoroughly effective in use, it is to be understood that the invention is not to be limited to the precise construction shown, as various details in construction and assemblage of the parts may be resorted to and still be within the scope of the invention.

Having thus described the invention, what I claim is—

In a camera, a base provided with guides, upwardly and rearwardly extending plates connected to the sides of said base and near the rear end thereof and provided with curved slots in the rearwardly-extending portion thereof, a rear frame, forwardly-projecting plates fixedly connected to said frame and hinged at their lower ends to the upper rear corner of the plates of the base, said forwardly-projecting plates adapted to support the said frame, means carried by the forwardly-projecting portions of the plates of the frame and engaging in the curved slots of the plates of the base for adjustably connecting the latter to the frame, and a sliding frame mounted upon the base and movable between the said guides, said rear frames supported by said plates a suitable distance above the base so as not to interfere with the movement of the sliding frame substantially as herein shown and described.

In testimony whereof I have hereunto set my hand in presence of two subscribing witnesses.

WILHELM GUNDERMANN.

Witnesses:
 ALBERT SCHNEIDER,
 FRITZ SCHNELL.